United States Patent [19]

Fauchier, II et al.

[11] 4,327,878
[45] May 4, 1982

[54] VARIABLE SPEED PHOTOGRAPHIC PAPER FEED SYSTEM

[75] Inventors: Jess F. Fauchier, II, Crystal; Richard D. Anderson, Maple Grove, both of Minn.

[73] Assignee: Pako, Corporation, Minneapolis, Minn.

[21] Appl. No.: 208,177

[22] Filed: Nov. 19, 1980

[51] Int. Cl.³ .......................................... B65H 17/02
[52] U.S. Cl. ............................ 242/67.3 R; 242/67.2; 242/68.5
[58] Field of Search ............ 242/68.5, 67.3 R, 67.1 R, 242/67.2, 67.5

[56] References Cited

U.S. PATENT DOCUMENTS

| | | | |
|---|---|---|---|
| 2,428,333 | 9/1947 | Lessler | 242/67.3 R X |
| 3,064,913 | 11/1962 | Badeau | 242/67.3 R |
| 3,228,622 | 1/1966 | Colecchi | 242/67.2 |
| 3,338,488 | 8/1967 | Hunt | 242/67.2 X |

*Primary Examiner*—Edward J. McCarthy
*Attorney, Agent, or Firm*—Kinney, Lange, Braddock, Westman and Fairbairn

[57] ABSTRACT

A paper feed system for a photographic printer which includes a motor driven takeup spool which pulls paper from a supply reel across a paper deck to the takeup spool. An encoder is turned by the paper, and provides encoder pulses which indicate incremental rotation of the encoder, and thus incremental movement of the paper. Prior to each paper feed cycle, a slow-down count is subtracted from a total feed length count to provide a high speed count. The motor is initially operated at high speed until the encoder has produced pulses equal to the high speed count. The motor is then switched to the low speed for the remaining portion of the paper feed corresponding to the slow-down count. During each paper feed cycle, the encoder pulses during the high speed portion of the paper feed are monitored to provide an indication of the average velocity of the paper during the high speed feed. The slow-down count for each paper feed cycle is a function of the average velocity from the previous paper feed cycle. As the takeup roll fills (i.e. its diameter increases), the paper velocity increases, and the slow-down count is increased to allow the paper the necessary time to equilibrate at the low speed prior to stopping the motor.

16 Claims, 2 Drawing Figures

VARIABLE SPEED PHOTOGRAPHIC PAPER FEED SYSTEM

BACKGROUND OF THE INVENTION

1. Field of the Invention

The present invention relates to paper feed systems for photographic printers.

2. Description of the Prior Art

In commercial photographic processing operations, photographic printers record photographic images in edge-to-edge relationship on a continuous web of photosensitive print paper. In this type of photographic printer, the print paper web is typically advanced by a predetermined feed length during each operating cycle of the printer in order to advance the next unexposed portion of the print paper web to a printing aperture. High intensity light is passed through the photographic film and imaged on the image area of the photographic print paper defined by the printing aperture to expose the photographic emulsion layers of the paper and record a photograhic image.

In the Pako B/C-24XL printer, the paper feed system which controls the feeding of the print paper web consists of a motor-driven takeup spool which pulls the paper web from a supply reel. As the paper is pulled from the supply reel to the takeup spool, a feed metering idler roller is turned. An encoder senses movement of the feed metering idler roller and produces a pulse for each increment of rotation. The motor which drives the takeup spool can be controlled at either of two preset levels, a high speed level and a low speed level. The motor is initially operated at high speed during a first portion of each paper feed and then is switched to low speed for the remainder of the feed cycle. The purpose of the low speed operation is to improve feed accuracy; the take-up roll will have less momentum at the time the motor is stopped since it is moving at the low speed. The disadvantage of the low speed operation, however, is that it increases the time required to complete a paper feed cycle, and thus affects the overall operating production rate of the printer.

SUMMARY OF THE INVENTION

The present invention is an improved paper feed system in which a motor-driven takeup spool pulls print paper from a supply reel, and in which the motor is operated at a high speed level and a low speed level. In the paper feed system of the present invention, paper velocity is determined during each paper feed cycle. The slow-down portion of each paper feed cycle is determined as a function of the high speed paper velocity during the previous paper feed cycle.

The present invention is based upon the recognition that a longer slow-down feed length is needed when the takeup roll is full than when it is empty. This is because the take-up roll decelerates more slowly when the takeup roll is full, and the purpose of the slow-down feed length is to allow the take-up motor to decelerate to the low speed level prior to stopping. With the present invention, therefore, as the takeup roll builds up, the slow-down feed length is adjusted, thus maintaining accuracy without sacrificing speed.

In the preferred embodiment, the present invention includes an encoder which produces a pulse for each increment of movement of the print paper web. A slow-down feed length count (in encoder pulses) is subtracted from a total feed length count (in encoder pulses) to provide a high speed feed length count. When a paper feed cycle is initiated, the motor is operated at high speed until the high speed feed length count has been attained. The motor is then switched to low speed until the slow-down count has been attained.

The average paper velocity during the high speed feed is determined by monitoring the number of encoder counts during the high speed feed and the time duration of the high speed feed. After each paper feed cycle, the average paper velocity is determined, and the corresponding slow-down count is then determined using a table of slow-down counts as a function of average paper velocity. The next paper feed cycle uses this slow-down count. After each paper feed, the slow-down count is updated, so that as the takeup roll fills up, the slow-down count changes with the changing paper velocity.

DETAILED DESCRIPTION OF THE PREFERRED EMBODIMENTS

Figure 1:
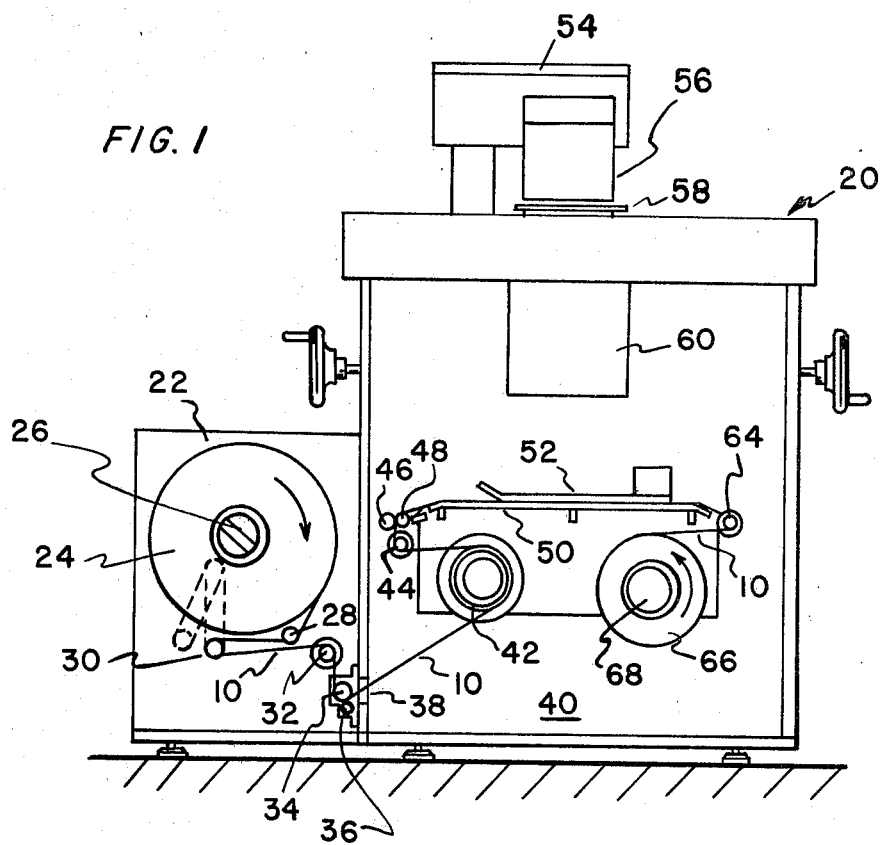
FIG. 1 shows a photographic printer utilizing the paper feed system of the present invention.

In FIG. 1, the paper feed system of photographic printer 20 is illustrated. Printer 20 includes a large paper supply housing 22. Roll 24 of unexposed print paper web 10 is mounted on supply spindle 26. Paper web 10 is fed from roll 24 over idler roller 28, bale arm 30, and idler roller 32, and between light lock rollers 34 and 36. Paper web 10 passes from light lock rollers 34 and 36 through opening 38 and into main housing 40 of printer 20.

Once within housing 40, paper web 10 passes over paper guide idler spool 42, over idler roller 44, between pressure roller 46 and feed metering idler roller 48, and onto paper deck 50. As paper web 10 is transported across the upper surface of paper deck 50, it passes under paper mask assembly 52, which has a printing aperture. The printing aperture defines an image area of print paper web 10 which is exposed to a photographic image. Light from lamp house 54 is directed downward by light mixing chamber assembly 56, passes through a negative in neghold 58, and is focused by optics 60 onto the image area defined by paper mask 52. After exposure, paper web 10 advances paper deck 50, over idler roller 64, and onto takeup roll 66 on takeup spindle or spool 68.

Figure 2:
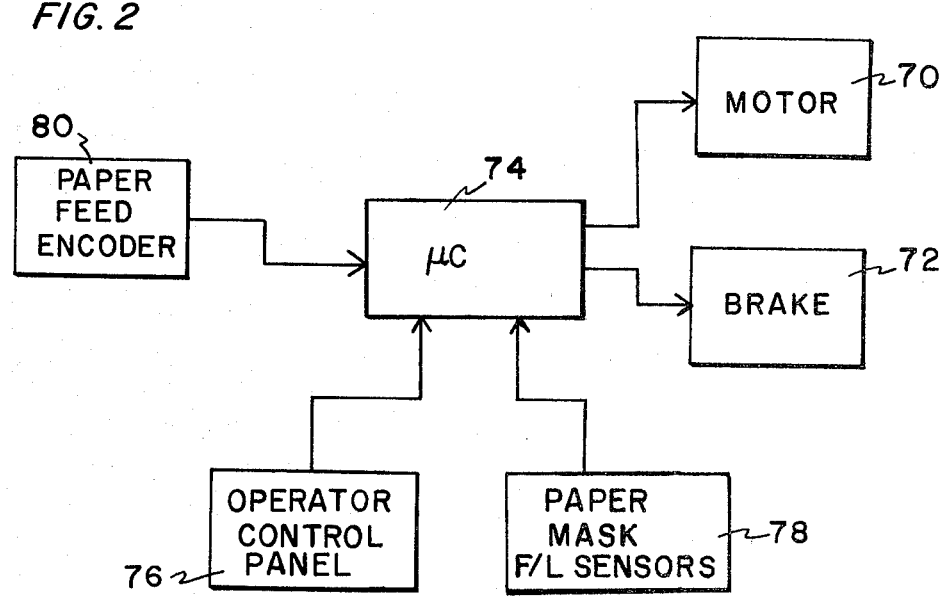
FIG. 2 is an electrical block diagram of a paper feed control system for use in the printer of FIG. 1.

In the preferred embodiment of the present invention illustrated in FIGS. 1 and 2, takeup spindle 68 is driven by motor 70. Brake 72 controls movement of feed metering idler roller 48. Microcomputer 74 controls operation of motor 70 and brake 72 during each paper feed cycle. The control of paper feed by microcomputer 74 is as a function of paper feed length information supplied by either operator control panel 76 or paper mask feed length sensors 78. Microcomputer 74 monitors the advancement of paper web 10 as motor 70 drives web 10 by means of paper feed encoder 80. In a preferred embodiment of the present invention, paper feed encoder 80 includes a slotted encoder wheel mounted on feed metering idler roller 48, and an optical sensor which provides a pulse each time a slot passes. Since feed metering idler roller 48 (and therefore the encoder wheel) is driven by paper web 10 as it is advanced from supply roll 24 to takeup roll 66, each pulse represents an incremental paper feed movement. By counting pulses from paper feed encoder 80, microcomputer 74 monitors paper feed distance.

Microcomputer 74 controls the speed of motor 70 at one of two preset levels which will be termed high speed and low speed. During a typical paper feed cycle, microcomputer 74 initially operates motor 70 at high speed, and then switches motor 70 to low speed in order to achieve the desired paper feed accuracy. In the preferred embodiment of the present invention, the high speed and low speed lengths are adjusted to compensate for the changing diameter of takeup roll 66. As takeup roll 66 increases in diameter, a longer slow-down feed count is needed because the takeup roll decelerates more slowly when takeup roll 66 is full. Microcomputer 74 monitors the high speed paper velocity (which is a function of the diameter of takeup roll 66), and varies the slow-down feed length accordingly. As takeup roll 66 increases in diameter, paper velocity during the high speed portion of the feed cycle increases, and microcomputer 74 increases the slow-down feed length count accordingly. If the slow-down feed length count is equal to or greater than the total feed length count, the high speed portion of the paper feed is zero, and the entire paper feed cycle is at low speed.

At the beginning of each feed cycle, microcomputer 74 subtracts a stored slow-down count from the total feed length count to be used for that feed cycle. The difference is the high speed count (if the total feed length is greater than the slow-down count) for this paper feed cycle. When microcomputer 74 initiates a paper feed, motor 70 is operated on high speed provided that the high speed count (representing the high speed portion of the paper feed, if any) is greater than zero. The high speed count is decremented by microcomputer 74 each time a pulse from paper feed encoder 80 is received. When the high speed count has been decremented to zero, microcomputer 74 reduces the speed of motor 70 to the low speed level and begins decrementing the slow-down count each time a pulse from paper feed encoder 80 is received. When the slow-down count has been decremented to zero, microcomputer 74 stops motor 70 and energizes brake 72.

Microcomputer 74 determines the average velocity of the paper during the high speed portion of the feed cycle by first measuring the duration of the high speed feed. Since the high speed count is known, microcomputer 74 determines the average velocity by dividing the high speed count by the duration of the high speed portion of the feed cycle.

Microcomputer 74 has stored a lookup table containing slow-down counts corresponding to various paper feed velocities. After each paper feed cycle, microcomputer 74 determines the average paper feed velocity, and then determines the corresponding slow-down count from the lookup table. This slow-down count is stored in memory by microcomputer 74, and is used as the slow-down count for the next paper feed cycle. In other words, after each paper feed cycle, the slow-down count is updated, based upon the average paper velocity during the high speed portion of the paper feed cycle. Thus, as takeup roll 66 fills up, either continuously or in stages, the slow-down count tracks the average high speed paper velocity, thus maintaining accuracy in the paper feed without sacrificing speed.

In a preferred embodiment of the present invention, the slow-down counts increase with increasing paper feed velocity. The slow-down counts are preferably selected so that take-up motor 70 equilibrates at the low speed just prior to stopping.

In the preferred embodiment of the present invention, a paper velocity less than a first predetermined low value or greater than a second predetermined high value indicates an error condition. In that event, microcomputer 74 uses a predetermined stored default value for the slow-down count and provides an error message to the operator.

After a machine clear or power on, microcomputer 74 initializes the slow-down count to a predetermined stored default value. This is a safety feature which assures that an adequate slow-down count will be provided during the first paper feed cycle after a machine clear or power on. As soon as the first paper feed cycle has been completed, microcomputer 74 determines the high speed average paper velocity and updates the slow-down count. Thus, after only one paper feed cycle, the slow-down count is readjusted to a value which is consistent with the average paper velocity.

If the takeup roll 66 is removed and the paper web leader is reattached to the takeup spindle 68 without any machine clear, the previous slow-down count in memory will be longer than needed for the first feed, but will maintain accuracy. The second feed will be updated with a current slow-down current value.

In conclusion, the paper feed control system of the present invention provides variable length slow-down feeds for a photographic printer having a motor-driven takeup spool which pulls photograhic print paper from a supply reel. With the system of the present invention, feed accuracy is improved without sacrificing operating speed of the printer. As the takeup roll increases in diameter, the average paper velocity increases. The paper feed control of the present invention increases the slow-down count, thus permitting the paper feed motor to equilibrate at low speed prior to stopping despite the increasing average paper velocity.

The present invention, which provides a variable slow-down count, is usable with a wide range of print paper widths and feed lengths.

The present invention provides improved paper feed accuracy whether supply roll 24 is mounted on external large spindle 26 (with constant bail arm load) or on an internal spindle (with a constant drag but gradually increasing paper tension and motor torque load requirements) which replaces guide spool 42.

Although the present invention has been described with reference to preferred embodiments, workers skilled in the art will recognize that changes may be made in form and detail without departing from the spirit and scope of the invention.

What is claimed is:

1. A paper feed system for a photographic printer comprising:
   supply means for supplying a photographic print paper web;
   a paper deck;
   a takeup spool upon which the print paper web is wound to form a takeup roll;
   motor means for driving the takeup spool to advance the paper web from the supply means across the paper deck and onto the takeup roll;
   means for sensing velocity of the printer paper web and providing an electrical signal representative of the sensed velocity; and control means for controlling operating speed of the motor as a function of the electrical signal representative of the sensed velocity of the print paper web.

2. The paper feed system of claim 1 wherein the motor means operates at a high speed level and a low speed level and wherein the control means operates the motor means during a paper feed cycle a first feed length at the high speed level and operates the motor means a second feed length at the low speed level.

3. The paper feed system of claim 2 wherein the control means varies the first and second feed lengths as a function of velocity of the print paper web.

4. The paper feed system of claim 3 wherein the control means increases the second feed length and decreases the first feed length with increasing velocity.

5. The paper feed system of claim 4 and further comprising:
  encoder means for providing encoder pulses indicative of incremental movement of the paper web; and
  wherein the control means counts the encoder pulses to determine when the first and second feed lengths are complete.

6. The paper feed system of claim 5 wherein the control means operates the motor means at the high speed level until it has counted a first count of encoder pulses, and then operates the motor means at the low speed level until it has counted a second count of encoder pulses.

7. The paper feed system of claim 6 wherein the control means stores a total feed length count indicative of a total number of encoder pulses during a paper feed cycle; wherein the control means determines, prior to each paper feed cycle, the second count as a function of paper velocity during a preceding paper feed cycle; and wherein the control means determines, prior to each paper feed cycle, the first count as a function of the total feed length count and the second count.

8. The paper feed system of claim 7 wherein the means for sensing velocity of the print paper web determines velocity based upon the number of encoder pulses produced during a selected time interval during a paper feed cycle and the time duration of the selected time interval.

9. The paper feed system of claim 8 wherein the selected time interval is from initiation of the paper feed cycle until completion of the first feed length.

10. The paper feed system of claim 9 wherein the control means indicates an error condition if the velocity is less than a first predetermined value or greater than a second predetermined value.

11. The paper feed system of claim 7 wherein the control means stores a table of second counts corresponding to different velocities, and wherein the control means determines the second count prior to each paper feed cycle based upon the sensed paper velocity during the preceding paper feed cycle and the stored table.

12. A paper feed system for a photographic printer comprising:
  supply means for supplying a photographic print paper web;
  a paper deck;
  a takeup spool upon which the print paper web is wound to form a takeup roll;
  motor means for driving the takeup spool to advance the paper web from the supply means across the paper deck and onto the takeup roll; and
  control means for operating the motor to advance the print paper web by a total feed length during each paper feed cycle, the control means operating the motor means at a high speed level for a first feed length and at a low speed level for a second feed length, and wherein the control means adjusts the second feed length to compensate for changing diameter of the takeup roll.

13. The paper feed system of claim 12 and further comprising:
  means for sensing a parameter which varies as a function of the diameter of the takeup roll; and
  wherein the control means adjusts the second feed length as a function of the sensed parameter.

14. The paper feed system of claim 13 wherein the parameter is a velocity of the print paper web during at least a portion of the paper feed cycle.

15. A paper feed system for a photograhic printer comprising:
  supply means for supplying a photographic print paper web;
  a takeup spool upon which the print paper web is wound to form a takeup roll;
  motor means for driving the takeup spool to advance the paper web from the supply means across the paper deck and onto the takeup roll;
  encoder means for providing encoder pulses indicative of incremental movement of the paper web; and
  control means for controlling the motor means to advance the paper web at a high speed level for a first count of encoder pulses and at a low speed level for a second count of encoder pulses, the control means selecting the first and second counts as a function of velocity of the print paper web during a preceding paper feed cycle.

16. The paper feed system of claim 15 wherein the control means determines the velocity of the print paper web based upon the first number of counts and a time duration required to count the first count of encoder pulses during a preceding paper feed cycle.

* * * * *